(12) United States Patent
Quisenberry et al.

(10) Patent No.: US 8,443,613 B2
(45) Date of Patent: May 21, 2013

(54) VEHICLE AIR COMFORT SYSTEM AND METHOD

(75) Inventors: Tony Quisenberry, Highland Village, TX (US); Sam K. McSpadden, Austin, TX (US); Christopher Alan Polser, Plano, TX (US); Niran Balachandran, Lewisville, TX (US)

(73) Assignee: ThermoTek, Inc., Flower Mound, TX (US)

( * ) Notice: Subject to any disclaimer, the term of this patent is extended or adjusted under 35 U.S.C. 154(b) by 605 days.

(21) Appl. No.: 12/549,319

(22) Filed: Aug. 27, 2009

(65) Prior Publication Data

US 2010/0050659 A1 Mar. 4, 2010

Related U.S. Application Data

(60) Provisional application No. 61/092,313, filed on Aug. 27, 2008.

(51) Int. Cl.
*F25B 21/02* (2006.01)

(52) U.S. Cl.
USPC .............................. 62/3.61; 62/3.2

(58) Field of Classification Search
USPC ............ 62/3.2, 3.3, 3.6, 3.61, 259.2; 361/696
See application file for complete search history.

(56) References Cited

U.S. PATENT DOCUMENTS

| | | | |
|---|---|---|---|
| 2,416,152 A | 2/1947 | Braun et al. | |
| 2,713,655 A | 7/1955 | Grubman | |
| 3,040,538 A | 6/1962 | Alsing | |
| 3,087,309 A | 4/1963 | Toulmin, Jr. | |
| 3,138,934 A | 6/1964 | Roane et al. | |
| 3,226,602 A | 12/1965 | Elfving | |
| 3,817,043 A | 6/1974 | Zoleta | |
| 4,290,273 A | 9/1981 | Meckler | |
| 4,301,658 A | 11/1981 | Reed | |
| 4,306,613 A | 12/1981 | Christopher | |
| 4,328,677 A | 5/1982 | Meckler | |
| 4,347,474 A | 8/1982 | Brooks et al. | |
| 4,449,576 A | 5/1984 | Baum et al. | |
| 4,463,569 A | 8/1984 | McLarty | |
| 4,478,277 A | 10/1984 | Friedman et al. | |

(Continued)

FOREIGN PATENT DOCUMENTS

| | | |
|---|---|---|
| DE | 3730830 A1 | 3/1989 |
| DE | 4036210 A1 | 5/1992 |

(Continued)

OTHER PUBLICATIONS

U.S. Appl. No. 13/250,159, Quisenberry.

(Continued)

*Primary Examiner* — Melvin Jones
(74) *Attorney, Agent, or Firm* — Winstead PC

(57) ABSTRACT

Systems and methods are provided for conditioning air inside an enclosure. The systems and methods may comprise: (1) a plurality of flow tunnels for passage of a heat-transfer fluid; (2) a thermoelectric cooler in thermal communication with the flow tunnels for thermally conditioning the heat-transfer fluid in the flow tunnels; (3) an air inlet for receiving unconditioned air; (4) a thermal exchange assembly for facilitating thermal exchange between the thermally conditioned heat-transfer fluid and the unconditioned air to result in conditioning of the air; and (5) an air outlet for outputting the conditioned air into the enclosure.

19 Claims, 7 Drawing Sheets

U.S. PATENT DOCUMENTS

| | | |
|---|---|---|
| 4,490,982 A | 1/1985 | Christmas |
| 4,631,728 A | 12/1986 | Simons |
| 4,685,081 A | 8/1987 | Richman |
| 4,709,323 A | 11/1987 | Lien |
| 4,718,249 A | 1/1988 | Hanson |
| 4,955,203 A | 9/1990 | Sundhar |
| 5,035,052 A | 7/1991 | Suzuki et al. |
| 5,079,618 A | 1/1992 | Farnworth |
| 5,097,829 A | 3/1992 | Quisenberry |
| 5,128,517 A | 7/1992 | Bailey et al. |
| 5,172,689 A | 12/1992 | Wright |
| 5,174,121 A | 12/1992 | Miller |
| 5,190,032 A | 3/1993 | Zacoi |
| 5,197,291 A | 3/1993 | Levinson |
| 5,197,294 A | 3/1993 | Galvan et al. |
| 5,255,520 A | 10/1993 | O'Geary et al. |
| 5,269,146 A * | 12/1993 | Kerner ............... 62/3.6 |
| 5,279,128 A | 1/1994 | Tomatsu et al. |
| 5,315,830 A | 5/1994 | Doke et al. |
| 5,361,587 A | 11/1994 | Hoffman |
| 5,371,665 A | 12/1994 | Quisenberry et al. |
| 5,450,727 A | 9/1995 | Ramirez et al. |
| 5,505,046 A | 4/1996 | Nelson et al. |
| 5,524,439 A * | 6/1996 | Gallup et al. ............... 62/3.5 |
| 5,528,485 A | 6/1996 | Devilbiss et al. |
| 5,561,981 A | 10/1996 | Quisenberry et al. |
| 5,588,300 A | 12/1996 | Larsson et al. |
| 6,029,471 A | 2/2000 | Taylor |
| 6,058,712 A | 5/2000 | Rajasubramanian et al. |
| 6,205,805 B1 * | 3/2001 | Takahashi et al. ............... 62/271 |
| 6,295,819 B1 | 10/2001 | Mathiprakasam et al. |
| 6,434,955 B1 * | 8/2002 | Ng et al. ............... 62/106 |
| 6,453,678 B1 | 9/2002 | Sundhar |
| 6,490,874 B2 | 12/2002 | Chu et al. |
| 6,591,614 B2 | 7/2003 | Smith et al. |
| 6,598,405 B2 | 7/2003 | Bell |
| 6,722,139 B2 * | 4/2004 | Moon et al. ............... 62/3.2 |
| 6,880,346 B1 * | 4/2005 | Tseng et al. ............... 62/3.7 |
| 6,935,409 B1 | 8/2005 | Parish IV et al. |
| 6,978,630 B2 | 12/2005 | Wensink et al. |
| 7,171,822 B2 | 2/2007 | Allen et al. |
| 7,237,397 B2 | 7/2007 | Allen |
| 7,240,494 B2 | 7/2007 | Akei et al. |
| 7,245,494 B2 * | 7/2007 | Cheng ............... 361/700 |
| 7,246,496 B2 | 7/2007 | Goenka et al. |
| 7,278,269 B2 | 10/2007 | Pham et al. |
| 7,296,416 B2 | 11/2007 | Akei et al. |
| 7,305,843 B2 | 12/2007 | Quisenberry et al. |
| 7,310,953 B2 | 12/2007 | Pham et al. |
| 7,370,486 B2 | 5/2008 | Grimm et al. |
| 7,394,655 B1 | 7/2008 | O'Keeffe |
| 2004/0250994 A1 | 12/2004 | Chordia |
| 2006/0034053 A1 | 2/2006 | Parish et al. |
| 2006/0144073 A1 * | 7/2006 | Lee et al. ............... 62/333 |
| 2006/0285331 A1 | 12/2006 | Wang et al. |
| 2007/0101747 A1 | 5/2007 | Eisenhour |
| 2007/0163270 A1 * | 7/2007 | Chien et al. ............... 62/3.3 |
| 2007/0204627 A1 | 9/2007 | Pan |
| 2008/0006040 A1 | 1/2008 | Peterson et al. |
| 2008/0028768 A1 * | 2/2008 | Goenka ............... 62/3.2 |
| 2008/0110179 A1 * | 5/2008 | Rice ............... 62/3.2 |
| 2008/0257395 A1 | 10/2008 | Jovanovic et al. |

FOREIGN PATENT DOCUMENTS

| | | |
|---|---|---|
| EP | 0478204 A2 | 4/1992 |
| GB | 2164135 A | 3/1986 |
| GB | 2174792 A | 11/1986 |
| GB | 2250337 A | 6/1992 |
| GB | 2260191 A | 4/1993 |
| JP | 57138415 A | 8/1982 |
| JP | 57188855 A | 11/1982 |
| JP | 7-106640 A | 4/1995 |
| JP | 8136422 A | 5/1996 |
| WO | WO-99/10191 A1 | 3/1999 |
| WO | WO 9910191 A1 * | 3/1999 |

OTHER PUBLICATIONS

Solar Panels Plus, "Yazaki Aroace Solar Air Conditions: Solar Powered Absorption Chillers and Heating", http://www.solarpanelsplus.com/yazaki-solar-HVAC/, May 26, 2010, (1page).

Cooling Mode, http://www.eurocooling.com/public_html/articleseagroup_file/image008.jpg, Mar. 4, 2010, (1 page).

Absorption Refrigerator, http://en.wikipedia.org/wiki/Gas_absorption_refrigerator, Mar. 4, 2010, (5 pages).

Refrigeration, http://en.wikipedia.org/wiki/Refrigeration, Mar. 1, 2010, ( 10 pages).

Young, Lee W., "International Search Report" for PCT/US11/54278 as mailed Feb. 29, 2012, 3 pages.

\* cited by examiner

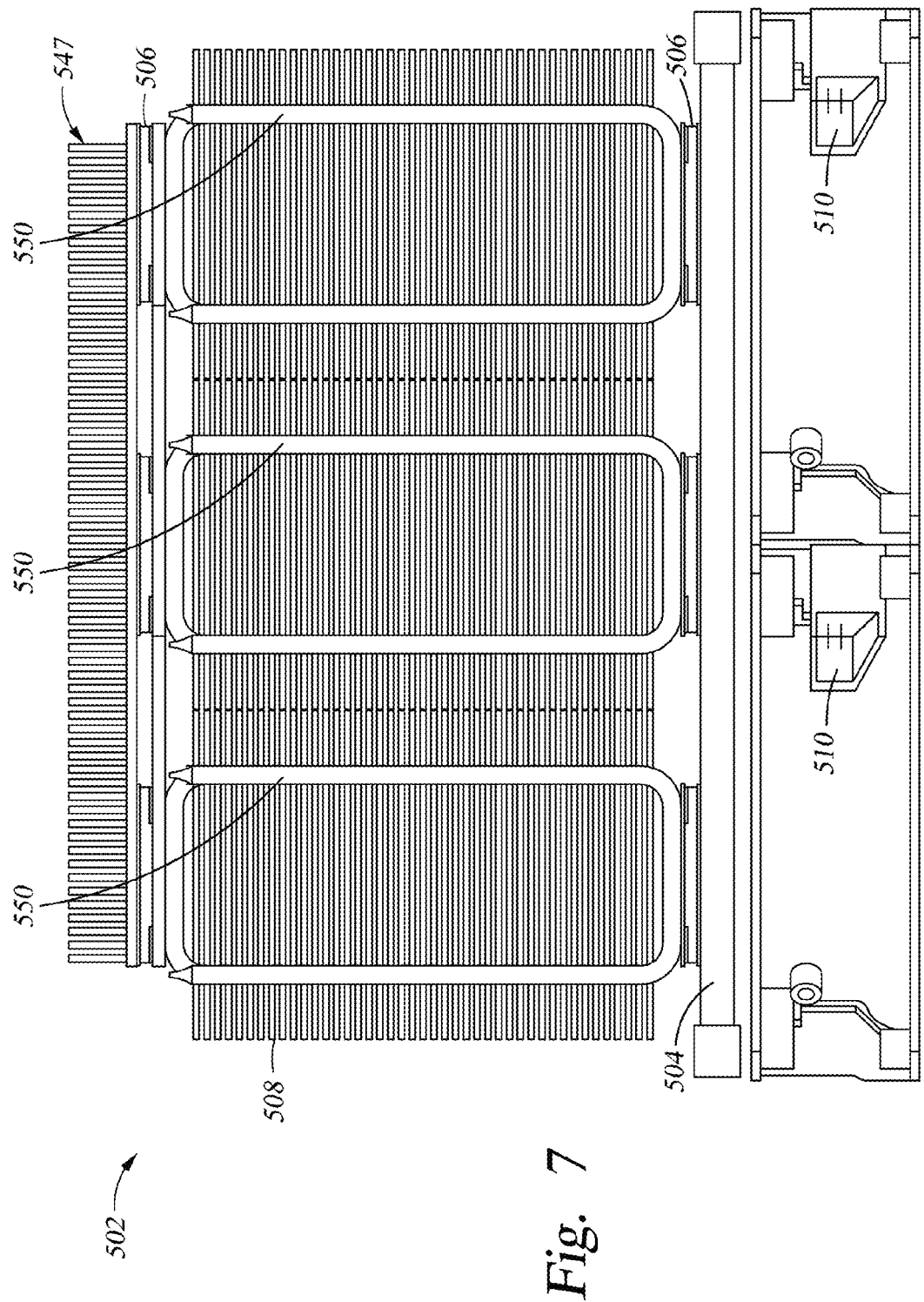

VEHICLE AIR COMFORT SYSTEM AND METHOD

RELATED APPLICATIONS

The present application claims priority to and incorporates by reference the entirety of U.S. Provisional Patent Application No. 61/092,313, filed on Aug. 27, 2008.

BACKGROUND

1. Technical Field

The present invention relates to air conditioning systems and methods, and more particularly, but not by way of limitation, to temperature control assemblies and methods for selective temperature control of enclosures, such as a passenger compartment of a vehicle.

2. History of Related Art

Temperature control systems such as vehicle heaters and air conditioners have improved in recent years. Most common in the transportation industry today are compressor based air-conditioning units that use power from the engine to drive the compressor. When the engine is idling, running the A/C unit may require the engine to idle at higher RPM's. Idling the engine at higher RPM's, however, causes an increase in noise, fuel consumption, and pollution. Furthermore, high fuel prices make it desirable to turn the vehicle's engine off when the vehicle is parked for extended periods of time. In order to run a compressor-based A/C unit while the engine is off, power from the vehicle's battery power is generally needed. Such battery use can, however, only be continued for a short period of time before the battery is completely emptied.

Federal and local regulations have exacerbated the problems associated with the above-mentioned issues. For environmental reasons, vehicles parked at truck stops are often only allowed to idle for a limited period of time, sometimes as little as only a few minutes. These limitations create problems because, for various reasons, vehicle drivers are often required to stay overnight at truck stops. For example, a driver may have reached the maximum number of operating hours allowed by company policy or other regulation, or the driver may have become too tired to continue driving safely.

It is well known that many commercial drivers choose to sleep in their respective vehicles while parked at truck stops or other rest areas. Whether during the day or night, the temperature outside may be too hot to comfortably sleep without air conditioning. In those situations, it would be desirable to have a vehicle air-conditioning unit capable of cooling an interior of the vehicle without running the vehicle's engine. It is also critical that any power consumption will not drain the vehicle's battery below the minimum level required to start the vehicle the next day.

Additionally, the temperature outside the vehicle may be too low for the driver to sleep comfortably in the vehicle without having a heater running. In those situations, it would be desirable to have a heating unit capable of heating an interior of the vehicle without requiring the vehicle's engine to be running. It would also be desirable for the heating unit to heat the interior of the vehicle in such a way that the vehicle's battery is not drained below the minimum level required to start the vehicle.

SUMMARY

The present invention relates to vehicle air comfort systems and methods. More particularly, one aspect of the present invention includes vehicle air comfort systems and methods which may be used to cool or heat unconditioned air in an efficient and environmentally friendly manner.

In some embodiments, a vehicle air comfort system is provided that comprises a plurality of flow tunnels for passage of a heat-transfer fluid. The vehicle air comfort systems may also comprise a thermoelectric cooler that is in thermal communication with the flow tunnels and operable in conjunction with an array of heat pipes to thermally condition the heat-transfer fluid in the flow tunnels. The system may further comprise an air inlet for receiving unconditioned air. In addition, the system may comprise a modular thermal exchange assembly that is operable to facilitate thermal exchange between the thermally conditioned heat-transfer fluid and the unconditioned air in order to condition the air. The system may also comprise an air outlet for outputting the conditioned air into a vehicle. In various embodiments, conditioning may comprise cooling or heating the unconditioned air.

In other embodiments, vehicle air comfort systems may further comprise a plurality of heat pipes having a plurality of fins thereon that are operable to dissipate thermal energy from the thermoelectric cooler. Likewise, the vehicle air comfort systems in some embodiments may comprise a thermoelectric cooler exhaust for outputting dissipated thermal energy from the thermoelectric cooler.

In some embodiments, the thermal exchange assembly may be a radiator-type heat exchanger. In some embodiments, the thermal exchange assembly may comprise a fluid inlet for receiving thermally conditioned heat transfer fluid, a body for facilitating thermal exchange between the thermally conditioned heat transfer fluid and the unconditioned air, and a fluid outlet for outputting the heat transfer fluid after the thermal exchange.

In additional embodiments, vehicle air comfort systems may comprise a tubing network that is operable to place the heat transfer assembly in fluid communication with the thermal exchange assembly. In some embodiments, the tubing network may be a closed-loop circuit. In additional embodiments, the tubing network may comprise a pump for facilitating the passage of the heat-transfer fluid. In various embodiments, the heat transfer fluid may be a coolant.

In some embodiments, vehicle air comfort systems may further comprise one or more fans for facilitating the movement of conditioned or unconditioned air over heat pipe arrays. In some embodiments, the vehicle air comfort systems may comprise a pre-cool unit for pre-cooling the unconditioned air. The vehicle air comfort systems of the present invention may also comprise one or more filter units for filtering the conditioned or unconditioned air. Similarly, the vehicle air comfort systems may comprise an evaporator unit for humidifying the conditioned or unconditioned air.

In additional embodiments, vehicle air comfort systems may also comprise one or more sensors for monitoring one or more operating conditions associated with the system. Vehicle air comfort systems may also comprise a user interface for monitoring and/or controlling one or more operating conditions associated with the system.

Other embodiments include methods for conditioning the air of a vehicle by the vehicle air conditioning systems of the present invention. In some embodiments, the methods may comprise: (1) passing a heat transfer fluid through the plurality of flow tunnels of the vehicle air comfort system; (2) thermally conditioning the heat-transfer fluid in the flow tunnels by the use of thermoelectric coolers and heat pipes in a modular array; (3) passing the thermally conditioned heat transfer fluid and unconditioned air through the thermal exchange assembly, wherein the passing results in thermal exchange between the heat transfer fluid and the unconditioned air, and wherein the thermal exchange results in the conditioning of the unconditioned air; and (4) outputting the conditioned air through the air outlet.

BRIEF DESCRIPTION OF THE DRAWINGS

A more complete understanding of the method and apparatus of the present invention may be obtained by reference to the following Detailed Description when taken in conjunction with the accompanying Drawings wherein:

FIG. 7 is a side view of the heat transfer assembly shown in FIG. 5.

DETAILED DESCRIPTION

In accordance with one aspect of the invention, methods and systems are provided that may afford a comfortable environment inside an enclosure, such as, for example, inside a parked vehicle.

Figure 2:
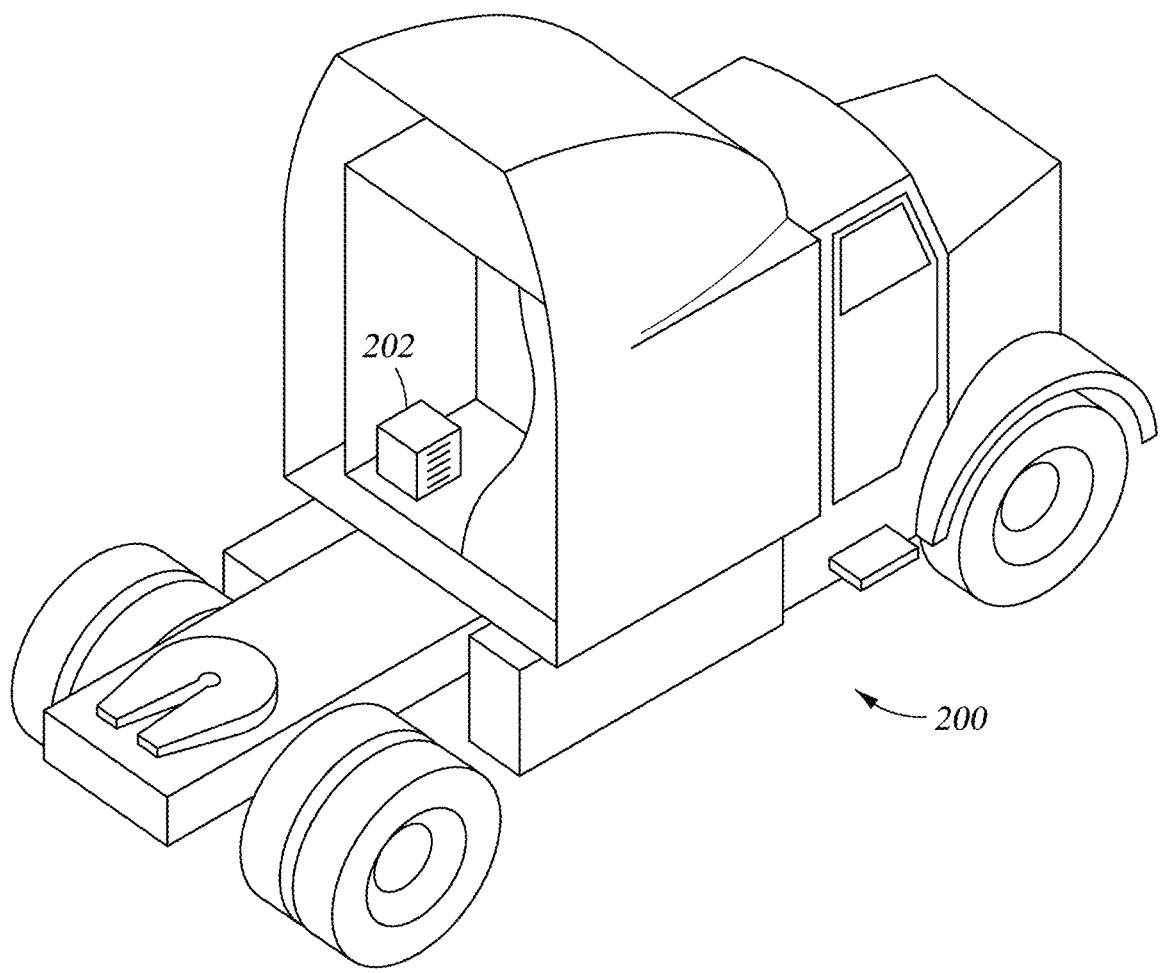
FIG. 2 is an illustration of one example of a vehicle using an air comfort system in accordance with one embodiment of the present invention.

Referring first to FIG. 2, a cutaway view of a tractor-trailer 200 is shown. An air comfort system 202 is shown disposed inside a sleeping area of the tractor-trailer 200. In various embodiments, the air-comfort system 202 may be utilized to heat and/or cool the air inside a passenger compartment of any vehicle, such as a bus, train, plane, or a cabin or sleeping space of an over-the-road truck, such as, for example, a Class 7 sleeper truck or a Class 8 day-cab truck. In various embodiments, the system 202 may have vents for dispersing the conditioned air within the enclosed area and, as will be described in more detail below, may also include vents coupled to an area outside the vehicle 200 for dispersing exhaust air outside the enclosed area. The size, shape, location, and other characteristics of the system 202 are only shown for exemplary purposes and any size, shape, location, or other characteristic may be utilized.

Figure 1:
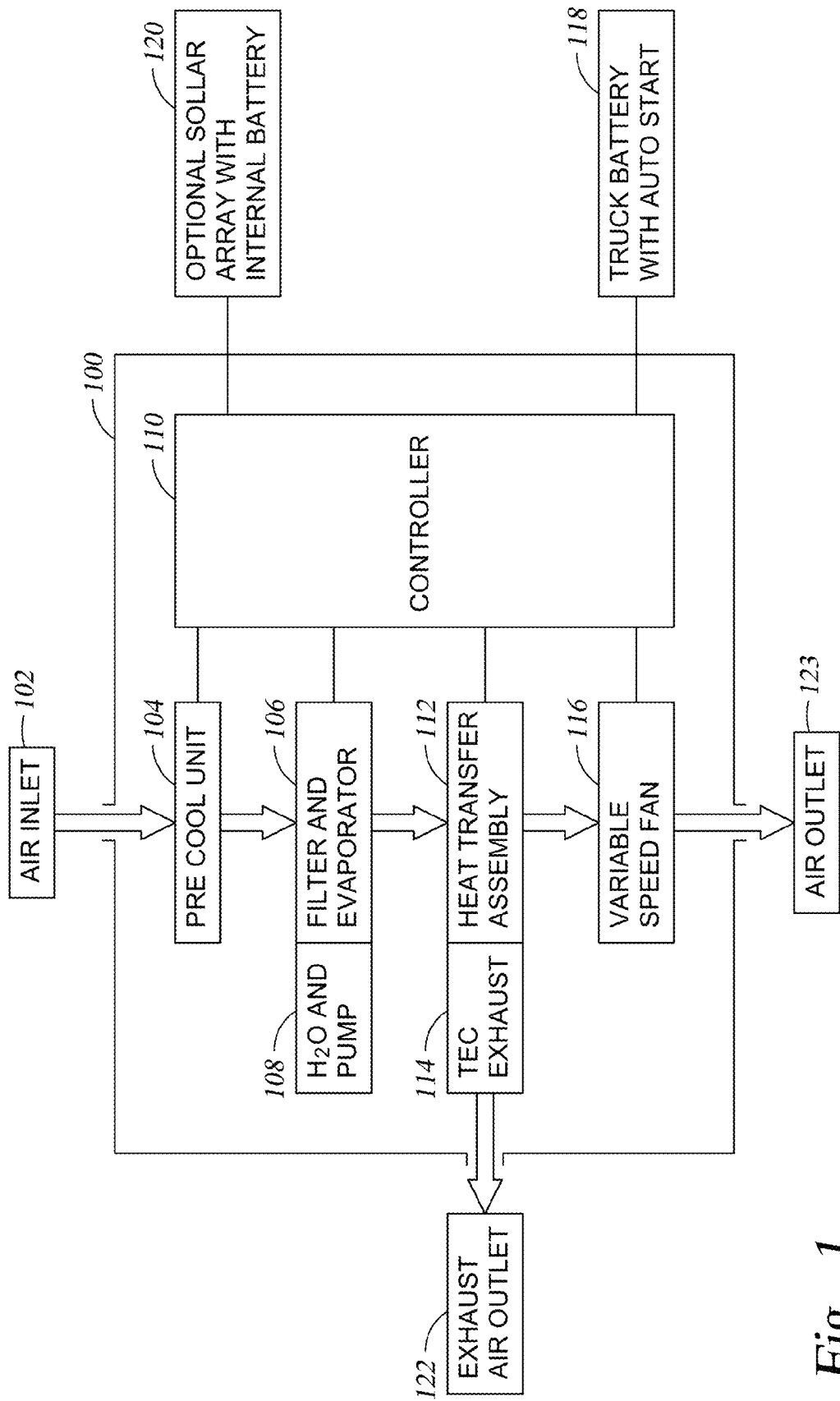
FIG. 1 is a block diagram of an air comfort system in accordance with one embodiment of the present invention.

Referring now to FIG. 1, a block diagram is shown of an embodiment of an air comfort system 100 adapted to cool the inside of an enclosure, such as, for example, a cabin and/or sleeping space of a tractor-trailer. The air comfort system 100 generally comprises air inlet 102, pre-cool unit 104, filter and evaporator 106, water and pump 108, controller 110, heat transfer assembly 112, TEC exhaust 114, exhaust air outlet 122, variable speed fan 116, and air outlet 123. As discussed in more detail below, in various embodiments, heat transfer assembly 112 may include a plurality of heat pipes, a plurality of fins, a plurality of thermoelectric coolers, and/or a plurality of flow tunnels.

Referring again to FIG. 1, air comfort system 100 is adapted to receive air via air inlet 102. The air passing through air inlet 102 may be air from either inside or outside the enclosure or a combination of the two. As will be explained in more detail below, the air may pass through a pre-cool unit 104 before going to a filter 106. Furthermore, as will be understood by one skilled in the art, the order in which the air is passed through the various modules of the air comfort system 100 may be varied while still accomplishing the goal of conditioning the air by either cooling or heating the air.

As shown in FIG. 1, the air comfort system 100 includes a variable speed fan 116 to pull air through the system 100. However, it is also contemplated that one or more variable speed fans 116 may be disposed at various locations in or around the system 100 in order to move the air. The variable-speed fans 116 may be utilized to either push the air through the system 100, pull the air through the system 100, or a combination of pushing and pulling the air through the system 100. In the embodiment shown, the air passes through a module 106 comprising a combination filter and evaporator before passing to a heat transfer assembly 112. In various embodiments, the module 106 may be only a filter, only an evaporator, both or may be neither. The filter of module 106 may help remove dirt, debris, allergens, and/or other contaminants from the air passing therethrough. The evaporator of module 106 may be a mist membrane that humidifies the air. In the embodiment shown, a pump 108 is used to deliver water from an $H_2O$ or other fluid reservoir to the mist membrane to increase the humidity of the air passing therethrough. In addition, a humidity sensor may be utilized to monitor the humidity of the air either before the mist membrane, after the mist membrane, or both. A determination may then be made as to whether the humidity of the air should be increased and/or whether evaporative cooling may be utilized to increase the efficiency of cooling the ambient air.

In the embodiment shown in FIG. 1, after the air passes through the filter and evaporator module 106, the air is then passed through the heat transfer assembly 112. As will be explained in more detail below, the heat transfer assembly 112 may include a plurality of flow tunnels with multiple fins on both an inside and an outside section thereof. The inside fins may produce a controlled temperature flow that is passed through the air outlet 123 via the variable speed fan 116. The outside fins may pass the opposite thermal flow of air to a TEC exhaust 114 to the exhaust air 122. In some embodiments, the system may produce the controlled temperature by either heating an ambient temperature or cooling an ambient temperature.

In various embodiments, a plurality of sensors may be utilized to monitor various aspects of the system 100 and/or the environment. For example, in various embodiments, the system 100 may have a controller 110 containing one or more processors adapted to receive a plurality of signals from one or more of the plurality of sensors. The sensors may be disposed so as to monitor the temperature inside the enclosed space, the temperature outside the enclosed space, the humidity of the air, the battery power, and/or any other aspect that may need to be monitored to ensure a comfortable environment inside the enclosed space. In some embodiments, the system 100 has a user interface in which a user can manually set and adjust a desired temperature. In some embodiments, the user interface may include a display and interface located on the system 100 and/or a user interface remotely disposed from the system 100 where the remotely disposed interface may be coupled to the system 100 via a wired link and/or a wireless link.

In various embodiments, the heat transfer assembly 112 heats or cools the air passing there across using a plurality of TECs. The temperature of the TECs may be controlled by controller 110 utilizing a pulse-width modulation and/or voltage variance in a manner adapted to reduce power consumption. In some embodiments, the system 100 may be powered from the vehicle's battery unit 118. The vehicle air comfort system may be powered by numerous sources, such as, for example, by the vehicle's battery unit, or by a power supply independent of the vehicle's battery unit. In various embodiments, the system may be powered by solar energy, Lead-Acid or Lithium-Ion batteries, and/or fuel cells.

Some embodiments may contain an alarm or auto-start function to prevent the battery 118 from discharging beyond truck-cranking capability. In some embodiments, the system 100 may be powered from a power supply independent of the vehicle's battery. In some embodiments, the system may utilize a solar array 120 to use and/or store solar energy. The solar array 120 may have an internal battery to maximize the solar energy available for use. In various embodiments, the system 100 may store energy for later use by cooling a phase-change medium disposed in an insulated unit, such as, for example, an ice tank. Thereafter, air may be cooled using this stored cooling prior to being used to cool the enclosed space either with or without additional cooling. In various embodiments, a vehicle air comfort system can further comprise one or more sensors for monitoring one or more conditions that are associated with a system. For instance, sensors may exist for monitoring conditions such as the temperature of the unconditioned air, the temperature of the conditioned air, the humidity of the conditioned air, and/or the humidity of the unconditioned air. In additional embodiments, the vehicle air comfort system can also comprise a user interface that is operable to display the monitored conditions to a user. In additional embodiments, a user interface may enable a user to control the monitored conditions. In further embodiments, a controller may control the monitored conditions automatically and/or remotely.

Figure 3:
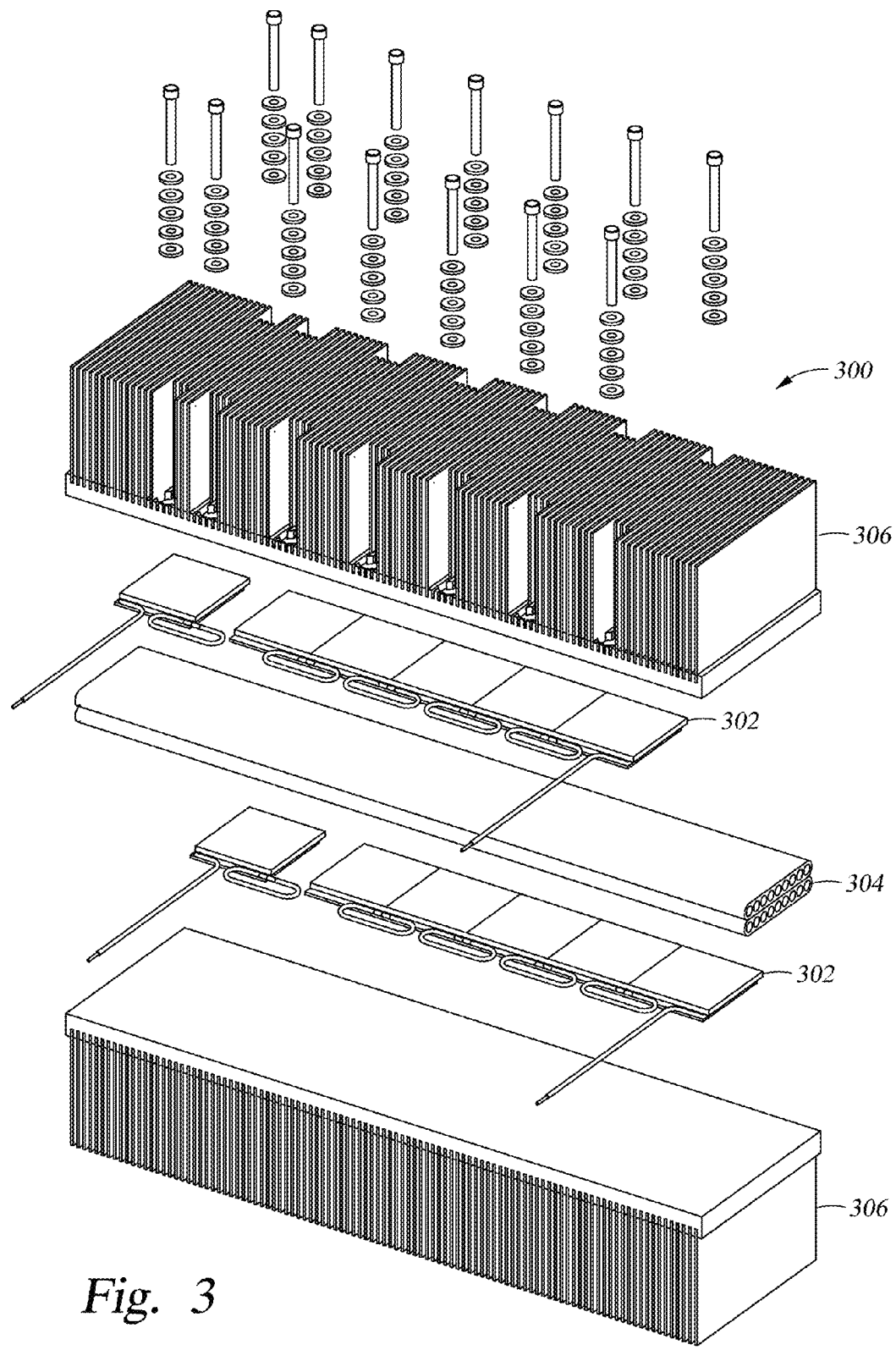
FIG. 3 is an exploded view of a heat transfer assembly in accordance with one embodiment of the present invention.

Referring now to FIG. 3, an exploded view of one embodiment of a heat transfer assembly 300 can be seen. In the embodiment shown, a plurality of flow tunnels 304 adapted for air and/or liquid to pass therethrough can be seen. On opposite sides of the flow tunnels 304, a plurality of TECs 302 can be seen. In the embodiment shown, the TECs 302 are in thermal communication with the flow tunnels 304. In addition, on the sides of the TECs 302 opposite of the flow tunnels 304, a plurality of fins 306 can be seen. When the heat transfer assembly 300 is being utilized to cool air and/or fluid passing through the flow tunnels 304, electricity is run through the TECs 302 to remove heat from the flow tunnels 304. Similarly, when the heat transfer assembly 300 is being utilized to heat air and/or fluid passing through the flow tunnels 304, electricity is run through the TECs 302 to add heat to the flow tunnels 304. In either mode of operation, the plurality of fins 306 are adapted to dissipate thermal energy from the TECs 302, as needed. As discussed in more detail below, various other embodiments of heat transfer assemblies may be utilized for transferring heat to and/or from the flow channels. For example, is various embodiments, heat transfer assemblies utilizing heat pipes and having configurations such as those described in U.S. Pat. No. 6,935,409, assigned to the assignee of the present invention and incorporated herein by reference, U.S. Pat. No. 7,305,843, assigned to the assignee of the present invention and incorporated herein by reference, and/or U.S. Pub. Pat. App. No. 2006/0034053, assigned to the assignee of the present invention and incorporated herein by reference.

Figure 4:
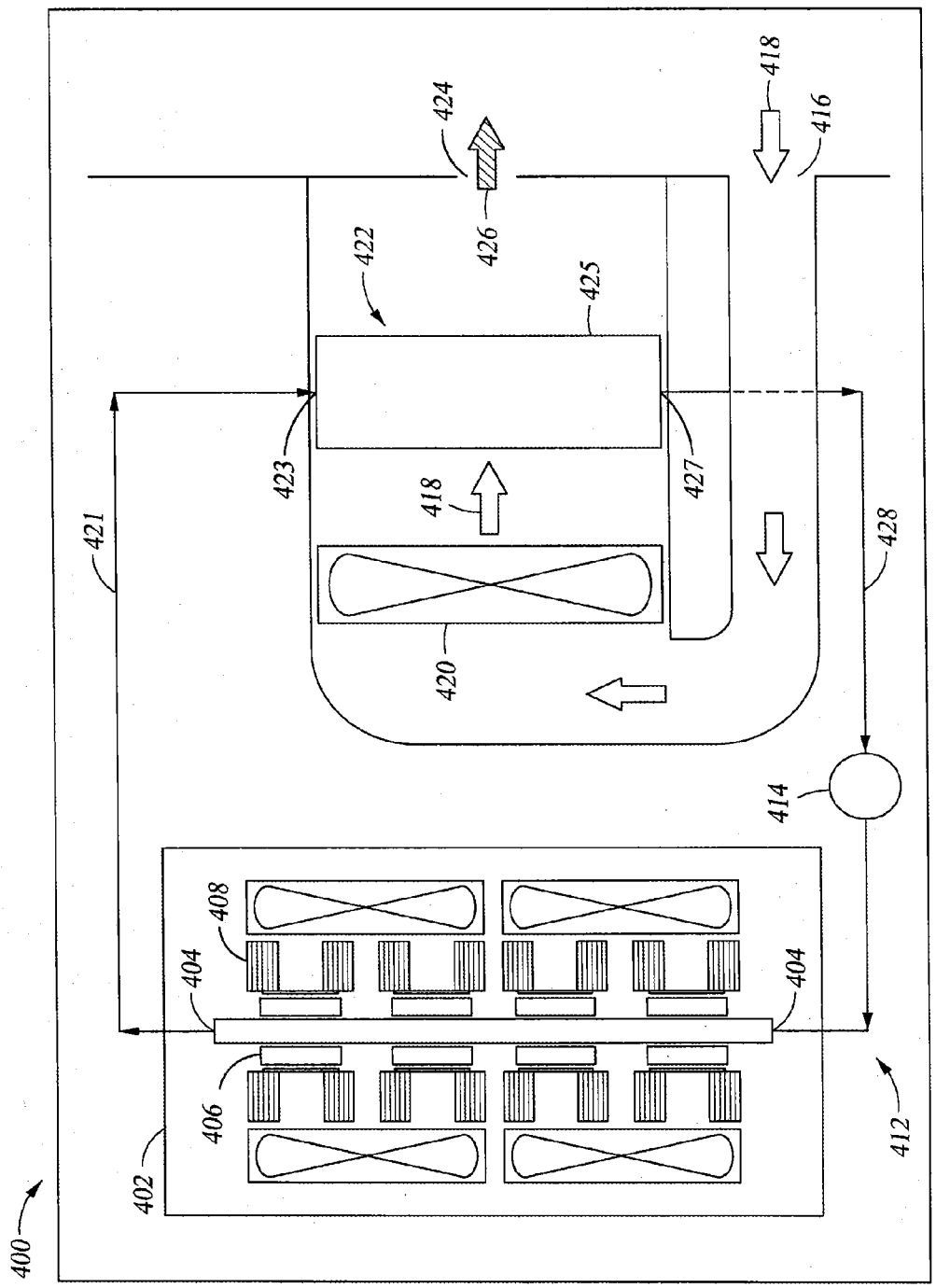
FIG. 4 is a block diagram of an air comfort system in accordance with one embodiment of the present invention.

Referring now to FIG. 4, a diagram of an air comfort system 400 is shown as an alternative embodiment of the air comfort system described above. The air comfort system 400 may include an air inlet 416 for receiving air 418 to be conditioned, a heat transfer assembly 402 for thermally conditioning a heat transfer fluid 428, and a thermal exchange assembly 422 for facilitating thermal exchange, such as heating and/or cooling, therebetween.

In various embodiments, the air comfort system 400 may include an air outlet 424, such as a vent, for outputting the conditioned air into a vehicle. In addition, the air comfort system 400 may contain a tubing network 412, such as, for example, a closed-loop circuit, for placing heat transfer assembly 402 in fluid communication with thermal exchange assembly 422. In addition, tubing network 412 comprises a pump 414 for facilitating the passage of the heat-transfer fluid through system 400. In various embodiments, other tubing networks may be utilized. Similarly, various heat transfer fluids may be used in conjunction with the air comfort system 400, such as, for example, water, alcohol, glycol, or other suitable heat transfer fluid or combination of fluids. As will be described in more detail below, heat transfer assembly 402 may include a plurality of flow tunnels 404, a plurality of heat pipes 408, and a plurality of thermoelectric coolers 406 therebetween and in thermal communication therewith.

As will be described in more detail below, various embodiments of the thermal exchange assembly 422 may include a fluid inlet 423 for receiving thermally conditioned heat transfer fluid 421, body 425 for facilitating thermal exchange between the heat transfer fluid 421 and unconditioned air 418, and fluid outlet 427 for outputting the heat transfer fluid after the heat exchange. In further embodiments, and as will be discussed in more detail below, thermal exchange assemblies may be associated with a dehumidifier for dehumidifying the conditioned or unconditioned air. In the embodiment shown in FIG. 4, a fan 420 is also in proximity to thermal exchange assembly 422 for facilitating the thermal exchange between the air and the thermal exchange fluid. However, in other embodiments, more fans may be present to facilitate such thermal exchange. In other embodiments, no fans may be present at all.

Vehicle air comfort systems in accordance with the second example described above have various modes of operation. For instance, in some embodiments, and with reference again to system 400 in FIG. 4, thermally unconditioned heat transfer fluid 428 in tubing network 412 first passes through flow tunnels 404. The heat transfer fluid is then thermally conditioned in the flow tunnels by the thermoelectric coolers 406. Next, the thermally conditioned heat transfer fluid 421 enters thermal exchange assembly 422 through fluid inlet 423. At the same time, unconditioned air 418 enters the system 400 through air inlet 416 and passes through thermal exchange assembly 422. The simultaneous flow of unconditioned air and thermally conditioned heat transfer fluid through thermal exchange assembly 422 results in thermal exchange between the heat transfer fluid and the unconditioned air. Consequently, the thermal exchange results in the conditioning of the unconditioned air. Thereafter, conditioned air 426 exits system 400 through air outlet 424.

In the embodiment shown in FIG. 4, tubing network 412 helps pass the heat-transfer fluid through the heat transfer assembly 402 and thermal exchange assembly 422. In addition, fan 420 facilitates the passing of the unconditioned air through the thermal exchange assembly 422. In the embodiment shown, fan 420 may also facilitate the outputting of the conditioned air 426 from system 400.

In some embodiments, air comfort systems of the present invention can cool unconditioned air. In such embodiments, the thermal conditioning of the heat transfer fluid entails the cooling of the heat-transfer fluid. This can occur through the extraction of heat from the flow tunnels by the TEC's (as previously described) as the heat transfer fluid passes through the flow tunnels. Similarly, in such embodiments, the thermal exchange entails the transfer of heat from the unconditioned air to the cooled heat transfer fluid to result in the cooling of the unconditioned air.

In other embodiments, air comfort systems of the present invention can heat unconditioned air. In such embodiments, the thermal conditioning of the heat transfer fluid entails the heating of the heat-transfer fluid. Such heating can occur by the addition of heat to the flow tunnels by the thermoelectric coolers (as previously described) as the heat transfer fluid passes through the flow tunnels. Similarly, in such embodiments, the thermal exchange entails the transfer of heat from the heat transfer fluid to the unconditioned air to result in the heating of the unconditioned air.

The conditioning of air by the use of the vehicle air comfort systems of the second example can also be in response to one or more monitored conditions, as previously described. Likewise, as described previously, such monitoring can occur by one or more sensors that may be detectable on a user interface.

Figure 5:
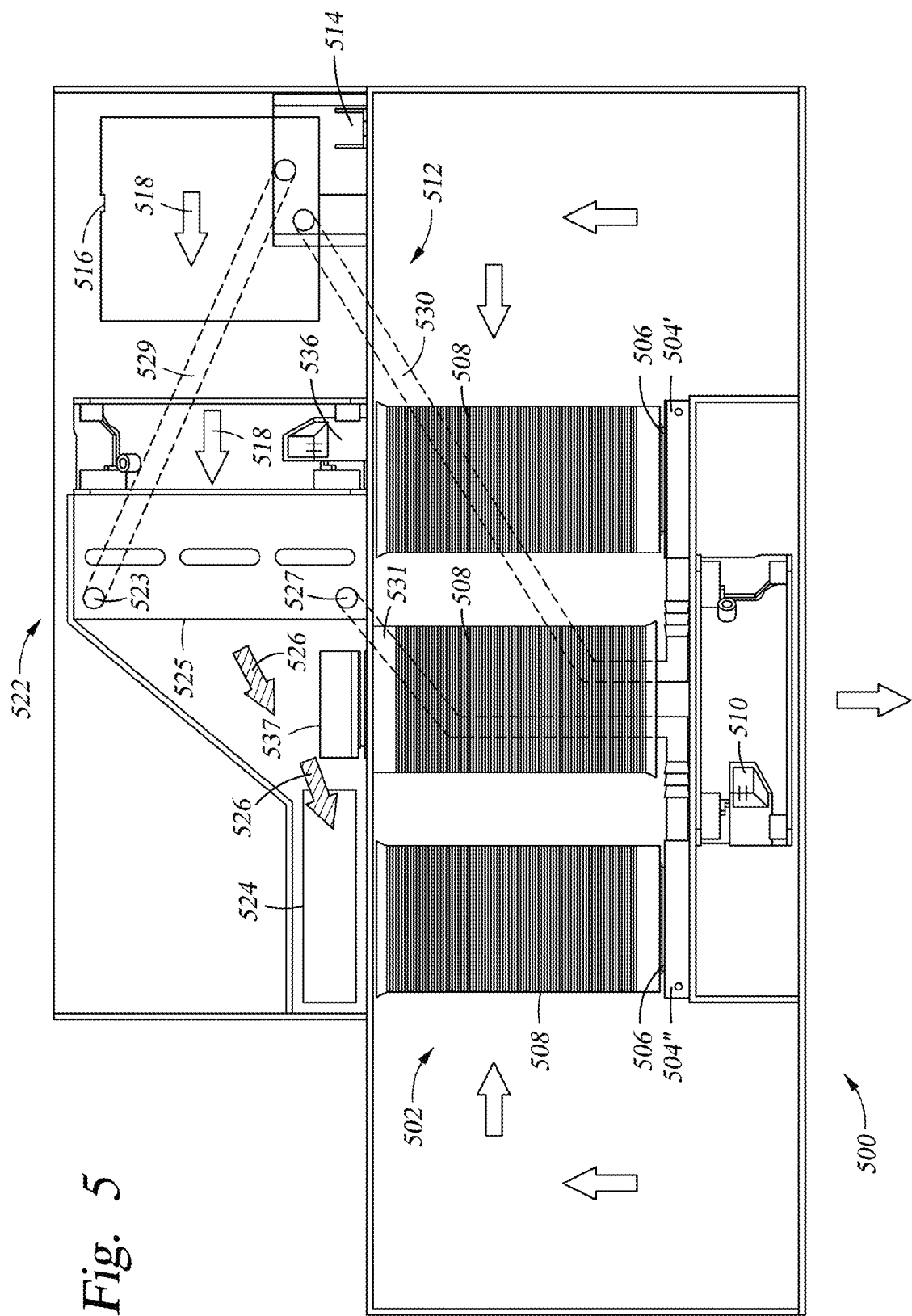
FIG. 5 is a cross-section view of an air comfort system in accordance with one embodiment of the present invention.
Figure 6:
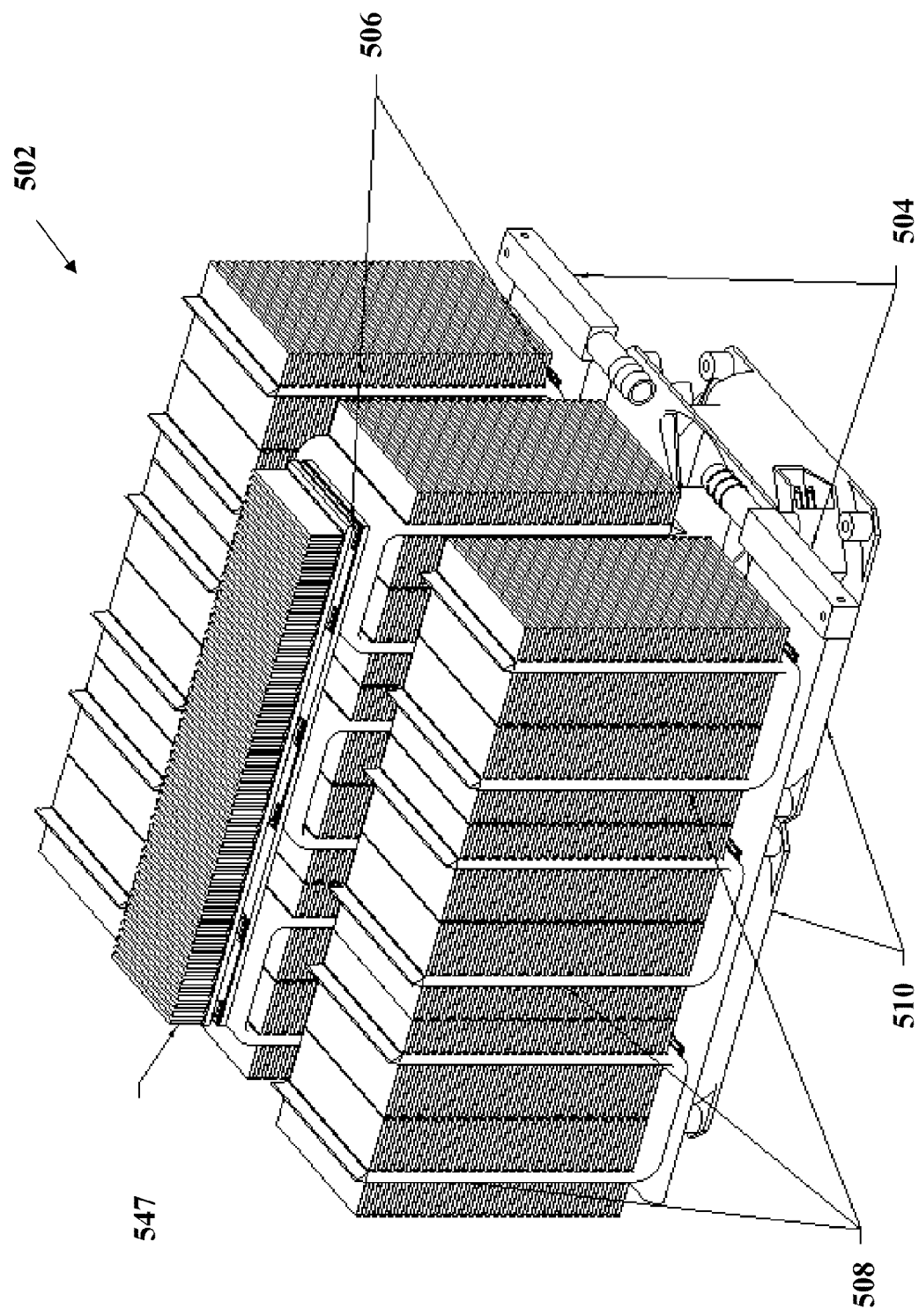
FIG. 6 is a cross-section view of the dehumidifier shown in FIG. 5.

Referring now to FIGS. 5-7 generally, various aspects of the air comfort system 400 of FIG. 4 are shown in more detail. In particular, FIG. 5 depicts an air comfort system 500 having, among other things, a thermal exchange assembly 522 and a heat transfer assembly 502. Beginning at air intake 516, air 518 being pulled by fan 536 enters the system and passes through a thermal exchanger 525 to be conditioned. The thermal exchanger 525 may be a liquid to air heat exchanger, such as, for example, a radiator. After being conditioned, the conditioned air 526 passes over a dehumidifier 537 to be dehumidified, if need be. The conditioned air 526 then exits the heat exchange assembly 522 at air outlet 524 for dispersion into an area to be heated and/or cooled.

In operation, the heat exchanger 525 is adapted to transfer heat to/from a heat transfer fluid from/to the air passing therethrough. As can be seen in the embodiment shown, a network of tubes 512 connects the thermal exchange assembly 522 to the heat transfer assembly 502 to provide the transfer of heat therebetween via the transfer fluid. Beginning with fluid pump 514, fluid is pumped from the heat transfer assembly 502 via tube 530 through the fluid pump 514 and to the inlet 523 of the thermal exchanger 525 via tube 529. Fluid exiting the outlet 527 of thermal exchanger 522 then goes to the heat transfer assembly via tube 531. After passing through the flow channels 504, the fluid is then pumped back to the fluid pump 514 to complete the loop. As will be explained in more detail below, the fluid facilitates the transfer of heat between the heat transfer assembly and the thermal exchanger.

In various embodiments, flow tunnels 504' and 504" receive thermally unconditioned heat transfer fluid from the tubes in tubing network 512. Thereafter, thermoelectric coolers 506 facilitate the thermal conditioning of the heat transfer fluid as it passes through the flow tunnels 504' and 504". Next, the heat transfer fluid passes through thermal exchange assembly 522 as previously described. At the same time, unconditioned air 518 enters system 500 through air inlet 516 and passes through thermal exchange assembly 522. This results in thermal exchange between the heat transfer fluid and the unconditioned air, and the conditioning of the air. Thereafter, conditioned air 526 exits system 500 through air outlet 524. Before exiting the system, conditioned air 526 may come into contact with dehumidifier 537. Such contact may result in the dehumification of the conditioned air before it exits the system. Furthermore, and as previously discussed, fans 510 may facilitate the thermal exchange process by pushing/pulling air across the fins of the heat pipe arrays.

Referring now to FIG. 6, a perspective view of an aspect of an embodiment of the heat transfer assembly 502 of FIG. 5 is shown. In the embodiment shown, the heat transfer assembly 502 includes three rows of heat pipe arrays 508, wherein each row includes three U-shaped heat pipes 508. In various other embodiments, more or less heat pipe arrays and/or rows thereof. Each U-shaped heat pipe includes two generally parallel leg portions and a generally flat base disposed therebetween and having a plurality of microtubes disposed therein, wherein the microtubes in the leg portions are in flow communication with microtubes in the base. The base of each heat pipe is thermally coupled to a thermoelectric cooler 506 and each of the leg portions have a plurality of fins disposed on either side thereof. As can be seen, the two outer rows of heat pipe arrays are oriented upwardly with their bases being coupled to TECs disposed therebelow. Disposed on an opposite side of the TECs are the flow channels. In a cooling mode of operation, heat is removed from the fluid flowing through the flow channels via the TECs and heat is then dissipated from the TECs to air flowing by via the heat pipe arrays. As can also be seen, the middle row of heat pipe arrays is oriented downwardly with its base being coupled to TECs disposed thereabove. In a cooling mode of operation, heat is removed from the dehumidification fins via the TECs and heat is then dissipated from the TECs to air flowing by via the heat pipe arrays. In a heating mode of operation, heat flows the opposite direction.

Referring now to FIG. 7, a side view of heat transfer assembly 502 is shown. As can be seen, a plurality of fans 510 are shown disposed below a plurality of heat pipe arrays 508. From this view, three generally U-shaped heat pipes 508 can be seen each having generally parallel leg portions 550 wherein each leg portion 550 has a plurality of fins coupled thereto for facilitating heat transfer therefrom. The generally U-shaped heat pipes 508 also have a generally flat base portion coupled between the generally parallel leg portions. Below the base portions are a plurality of flow channels 504 and a plurality of TECs 506 disposed therebetween. In the cooling mode of operation, the TECs 506 remove heat from the heat transfer fluid flowing through the flow channels thermally coupled thereto. Heat is then removed from the TECs 506 via the heat pipes coupled thereto and then dissipated to air flowing past the fin portions of the heat pipes. The fans 510 may be adapted to push and/or pull air past the fins to facilitate heat transfer therefrom. The fins of the dehumidifier 547 can also be seen coupled to a base portion of a row of heat pipe arrays disposed behind the front row of heat pipe arrays.

In various embodiments, the system may utilize TECs with a COP of greater than 1 at a ΔT of −20° C. from ambient. In various embodiments, the system has an efficiency such that a passenger space of a vehicle can be cooled to 24° C. in a 35° C. ambient for over 10 hours on a single battery charge cycle.

In various embodiments, the following results have been achieved based on the following assumptions, while in various embodiments better results have been achieved:

| | |
|---|---|
| Sleeper volume: | 155.02 ft$^3$ |
| Cab volume: | 71.15 ft$^3$ |
| Interior control airflow: | 10-100 CFM |
| Maximum interior humidity: | 50% |
| Interior Control Air Temperature: | 20-25.6° C. (68-78° F.) |
| Exterior Maximum Ambient Temperature: | 35° C. (95° F.) |
| Interior Temperature @ an ambient of 35° C.: | 24° C. (75° F.) |
| Exterior Minimum Ambient Temperature | −35° C. (−31° F.) |
| Estimated insulation R value: | 3.5 ft$^2 \cdot$ ° F.$^{hr/BTU}$ |
| Required Run Time: | 8-10 Hrs |
| Min Charge Time: | 4 Hrs |

Utilizing these requirements, the cooling system for the sleeper environment is estimated to be:

| | |
|---|---:|
| Heat gained form ambient (worst case 35° C. ambient): | 259 W |
| Heat gained from individual: | 60-100 W [1] |
| At rest a human body releases 1000 g of moisture per 24 period. | |
| Dehumidification power required to maintain 50% RH @ 25° C.: | 26 W |
| Total power required for cooling (Worst Case): | 385 W |

The Cab environment estimate is:

| | |
|---|---:|
| Heat gained form ambient: | 119 W |
| Heat gained from individual: | 60-100 W [1] |
| Dehumidification power required to maintain 50% RH @ 25° C.: | 26 W |
| Total power required for cooling: | 245 W |

Similarly the heating system for the sleeper environment is estimated to be:

| | |
|---|---:|
| Heat lost to ambient (worst case −35° C. ambient): | 1,283 W |
| Heat gained from individual: | 60-100 W [1] |
| Dehumidification power required to maintain 50% RH @ 25° C.: | 26 W |
| Total power required for heating (worst Case): | 1,209 W |

The Cab environment estimate is:

| | |
|---|---:|
| Heat gained form ambient: | 589 W |
| Heat gained from individual: | 60-100 W [1] |
| Dehumidification power required to maintain 50% RH @ 25° C.: | 26 W |
| Total power required for heating (worst case): | 515 W |

As explained above, the system may include various modular components. On component may include utilizing TECs for a heat pumping performance of approximately 385 Watts @ −11° C. ΔT from ambient. For reference purposes, most commercially available thermoelectric modules yield a COP of 0.5 to 0.6 when used under these conditions. In various embodiments, the modules described above have been able to achieve a COP of 1.0 or better at −20° C. ΔT from ambient. In various embodiments, a COP of 1.05 or better has been achieved. In various embodiments, 40 W heat pumping may be achieved at a −16° C. ΔT from ambient, with an input power of just 38 Watts.

In various embodiments, the dehumidifier fin may be cooled to less than 5° C. in a 35° C. ambient in order to provide a greater operational envelope for the dehumidifier performance to achieve a temperature below the dew point of the air passing thereover. Humidity may then be collected and channels may then be provided to drain the collected moisture.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A vehicle air comfort system comprising:
a plurality of flow tunnels for flow of a heat-transfer fluid therethrough;
a thermoelectric cooler in thermal communication with the plurality of flow tunnels, the thermoelectric cooler being constructed with a plurality of thermoelectric chips and an array of heat pipes in thermal engagement therewith, the thermoelectric cooler being constructed to thermally condition the heat-transfer fluid in the plurality of flow tunnels;
an air inlet for receiving unconditioned air;
a thermal exchange assembly operable to facilitate thermal exchange between the thermally conditioned heat-transfer fluid and the unconditioned air, wherein the thermal exchange results in conditioning of the unconditioned air, thereby changing the unconditioned air into conditioned air;
an evaporator fluidly coupled to the air inlet and the thermal exchange assembly, the evaporator comprising a mist membrane for adjusting humidity of the unconditioned air;
a humidity-adjustment unit fluidly coupled to the thermal exchange assembly, the humidity-adjustment unit constructed to adjust humidity of the conditioned air; and
an air outlet for outputting the conditioned air into a vehicle.

2. The vehicle air comfort system of claim 1, wherein:
the conditioning of the unconditioned air comprises cooling the unconditioned air;
the thermal conditioning of the heat-transfer fluid comprises cooling the heat-transfer fluid; and
the thermal exchange comprises transfer of heat from the unconditioned air to the thermally conditioned heat-transfer fluid.

3. The vehicle air comfort system of claim 1, wherein:
the conditioning of the unconditioned air comprises heating the unconditioned air;
the thermal conditioning of the heat-transfer fluid comprises heating the heat-transfer fluid; and
the thermal exchange comprises transfer of heat from the thermally conditioned heat-transfer fluid to the unconditioned air.

4. The vehicle air comfort system of claim 1, wherein the system further comprises a plurality of fins in thermal contact with the array of heat pipes and constructed to dissipate thermal energy from the array of heat pipes and the thermoelectric cooler.

5. The vehicle air comfort system of claim 1, wherein the system further comprises a thermoelectric cooler exhaust for outputting dissipated thermal energy from the thermoelectric cooler.

6. The vehicle air comfort system of claim 1, wherein the thermal exchange assembly comprises:
a fluid inlet for receiving the thermally conditioned heat-transfer fluid;
a body for facilitating thermal exchange between the thermally conditioned heat-transfer fluid and the unconditioned air; and
a fluid outlet for outputting the heat-transfer fluid after the thermal exchange.

7. The vehicle air comfort system of claim 1, wherein the thermal exchange assembly is a radiator.

8. The vehicle air comfort system of claim 1, further comprising a tubing network constructed to place the plurality of flow tunnels in fluid communication with the thermal exchange assembly.

9. The vehicle air comfort system of claim 8, wherein the tubing network is a closed-loop circuit.

10. The vehicle air comfort system of claim 8, further comprising a pump for facilitating transport of the heat-transfer fluid through the tubing network.

11. The vehicle air comfort system of claim 1, further comprising a fan for facilitating movement of at least one of the conditioned air and the unconditioned air.

12. The vehicle air comfort system of claim 11, wherein the fan moves the unconditioned air from the air inlet to the thermal exchange assembly.

13. The vehicle air comfort system of claim 11, wherein the fan moves the conditioned air from the thermal exchange assembly to the air outlet.

14. The vehicle air comfort system of claim 1, wherein the array of heat pipes comprise generally U-shaped assemblies having fins secured thereto for thermal dissipation therefrom.

15. The vehicle air comfort system of claim 1, wherein the system is powered from a battery unit power source within the vehicle.

16. A method of conditioning air of a vehicle, the method comprising:
providing an air comfort system including an air inlet for receiving unconditioned air, a plurality of flow tunnels, a thermoelectric cooler in thermal communication with the flow tunnels, a thermal exchange assembly, and an air outlet for outputting conditioned air;
mounting an array of heat pipes within the thermoelectric cooler for heat dissipation;
passing a heat-transfer fluid through the plurality of flow tunnels;
thermally conditioning the heat-transfer fluid in the plurality of flow tunnels, wherein the thermal conditioning is facilitated by the thermoelectric cooler;
passing the unconditioned air through an evaporator, the evaporator comprising a mist membrane for adjusting a humidity of the unconditioned air;
passing the thermally conditioned heat-transfer fluid and the unconditioned air through the thermal exchange assembly, resulting in a thermal exchange between the heat-transfer fluid and the unconditioned air, wherein the thermal exchange results in conditioning of the unconditioned air;
passing the conditioned air through a humidity-adjustment unit fluidly coupled to the thermal exchange assembly, the humidity-adjustment unit constructed to adjust a humidity of the conditioned air; and
outputting the conditioned air through the air outlet into the vehicle.

17. The method of claim 16 comprising:
cooling the heat-transfer fluid; and
transferring heat from the unconditioned air to the thermally conditioned heat-transfer fluid resulting in the cooling of the unconditioned air.

18. The method of claim 16 comprising:
heating the heat-transfer fluid; and
transferring heat from the thermally conditioned heat-transfer fluid to the unconditioned air resulting in the heating of the unconditioned air.

19. The method of claim 16 comprising:
monitoring, via a sensor, a condition for operation of the air comfort system, the condition being selected from the group consisting of a temperature of the unconditioned heat-transfer fluid, a temperature of the conditioned heat-transfer, a temperature of the unconditioned air, a temperature of the conditioned air, a humidity of the conditioned air, and a humidity of the unconditioned air.

* * * * *